Jan. 10, 1956  W. J. WESTENDORF  2,730,612
TROUBLE LIGHT GUARD
Filed Dec. 3, 1954
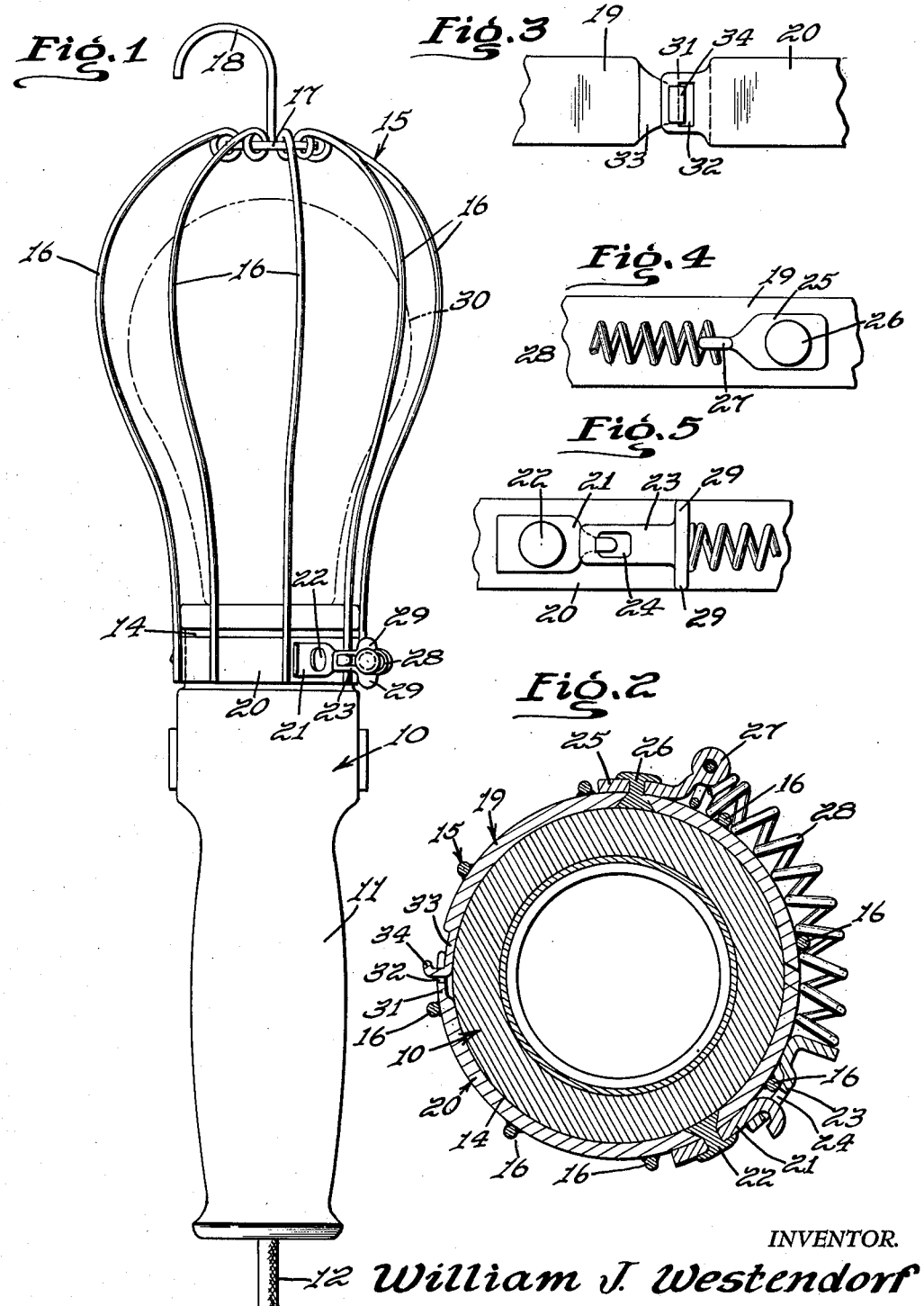
INVENTOR.
William J. Westendorf
BY Victor J. Evans & Co.
ATTORNEYS

United States Patent Office 2,730,612
Patented Jan. 10, 1956

2,730,612
TROUBLE LIGHT GUARD
William J. Westendorf, Kittanning, Pa.

Application December 3, 1954, Serial No. 472,980

3 Claims. (Cl. 240—54)

This invention relates to a light bulb or light such as a trouble light or extension light, and more particularly to a guard or shield for an extension light.

The object of the invention is to provide a guard which can be easily attached to or detached from an extension light and wherein there will be no possibility of the guard becoming accidentally detached from the light.

Another object of the invention is to provide a light guard mounting means whereby the guard is held securely on the light so that the bulb will not be broken by contact with objects, and wherein the guard can be easily detached from the light by a simple manual pressure on the proper part of the guard.

A further object of the invention is to provide an extension light guard which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the extension light with the guard of the present invention mounted thereon.

Figure 2 is a cross sectional view showing the means for attaching the guard to the extension light.

Figure 3 is a fragmentary side elevational view showing the connection between the bracket and the base of the guard.

Figure 4 is a fragmentary side elevational view showing a portion of the spring mounting.

Figure 5 is a fragmentary side elevational view showing the finger engaging means which is used when the guard is to be released.

Referring in detail to the drawings, the numeral 10 designates a head which may form part of an extension or trouble light, and the head 10 may include the usual gripping handle 11 which can be connected to a suitable source of electrical energy by means of the wire 12, Figure 1. The head 10 may be shaped to include a reduced diameter neck 14, and the numeral 15 designates a guard or shield. The guard 15 includes a plurality of wire ribs 16 which may be interconnected together at one end by means of a ring member 17, and a hook 18 extends from the frame 15 whereby the light can be suspended from an object when desired.

A means is provided for connecting the guard 15 to the head 10, and this means comprises a bracket 19 and a base 20, Figure 2. The bracket 19 and the base 20 each has a substantially semi-circular shape, and these members can be made of any suitable material such as metal.

Secured to the base 20 in any suitable manner, as for example by means of a rivet 22 is a hook member 21. A lug 23 is provided with an opening 24 for receiving the outwardly extending portion of the hook 21 and the lug 23 is secured as by welding to one end of a coil spring 28. A body member 25 is secured to the bracket 19 in any suitable manner, as for example by means of a rivet 26, and the body member 25 includes a body portion 27 which engages an end of the coil spring 28. The lug 23 includes outwardly extending portions 29 which are adapted to be engaged by a person's finger or fingers so that the spring 28 can be extended from the position shown in Figure 2 whereby the lug 23 can be disengaged from the hook 21 as for example when the guard 15 is to be removed in order to permit changing of the light bulb 30.

The ribs 16 are secured to the outer surface of the base 20 and the bracket 19 in any suitable manner, as for example by welding.

The adjacent ends of the bracket 19 and base 20 are interconnected together by means of an interengaging means. Thus, an end of the base 20 is of reduced thickness as at 31 and this reduced thickness portion 31 includes an aperture or opening 32. The adjacent end of the bracket 19 is also of reduced thickness as at 33, and a finger or hook 34 extends from the portion 33 and projects through the aperture 32. Due to this construction, as well as the previously described mechanism, the bracket 19 and base 20 can be entirely separated from each other when desired.

From the foregoing it is apparent that there has been provided a guard for a trouble light or extension light. In use the guard 15 can be mounted on the light as shown in Figures 1 and 2. The hook 21 extends through the opening 24 in the lug 23 and the finger 34 extends through the opening 32 so that the spring 28 will maintain the bracket 19 and base 20 secured in place on the neck 14 of the lamp. In the event the bulb 30 has to be replaced as when it burns out, then it is only necessary to exert a slight manual pressure on the portions 29 of the lug 23 whereby the lug 23 can be freed from engagement with the hook 21 so that the bracket 19 can be disengaged from the base 20. Then the entire device can be removed from the lamp or light. With the parts arranged as shown in Figures 1 and 2, the guard will be held securely on the lamp so that there is no possibility of accidental disengagement of the guard from the lamp.

The ribs 16 of the guard frame 15 will prevent the lamp bulb 30 from being broken or destroyed by coming in contact with various objects or articles. With the present invention bulbs can be changed quickly since the guard frame is readily removed from the lamp. The extensions 29 are adapted to be engaged by the finger for releasing the spring mechanism 28. Instead of using rivets to fasten the parts in place, welding can be resorted to.

I claim:

1. In a guard for an extension light of the type including a handle having a head and a neck of reduced diameter, a frame including a plurality of spaced apart cylindrical ribs, a ring member secured to adjacent ends of said ribs, an arcuate base of substantially semi-circular shape engaging said neck, a bracket of substantially semi-circular shape also engaging a portion of said neck, said ribs being secured to the outer surface of said bracket and base, a hook member arranged contiguous to the outer surface of said base and secured thereto, a body member secured to said bracket and including a body portion, a coil spring having one end arranged in engagement with said body portion, a lug secured to the other end of said coil spring and provided with an aperture for receiving said hook member, and interengaging means on said base and bracket for interconnecting the adjacent ends of said base and bracket.

2. In a guard for an extension light of the type including a handle having a head and a neck of reduced diameter, a frame including a plurality of spaced apart cylindrical ribs, a ring member secured to adjacent ends of said ribs, an arcuate base of substantially semi-circular shape engaging said neck, a bracket of substantially semi-circular shape also engaging a portion of said neck, said ribs being secured to the outer surface of said bracket and base, a hook member arranged contiguous to the outer surface of said base and secured thereto, a body member secured to said bracket and including a body portion, a coil spring having one end arranged in engagement with said body portion, a lug secured to the other end of said coil spring and provided with an aperture for receiving said hook member, and interengaging means on said base and bracket for interconnecting the adjacent ends of said base and bracket, said interengaging means comprising cutouts in said base and bracket defining overlapping portions of reduced thickness, there being an opening in the portion of reduced thickness on the base, and a finger extending from the reduced thickness portion on the bracket for engagement with said last named opening.

3. The structure as defined in claim 2, and further including finger engaging extensions projecting from said lug.

References Cited in the file of this patent

UNITED STATES PATENTS

| | | |
|---|---|---|
| 2,178,907 | Hockley | Nov. 7, 1939 |
| 2,652,484 | Graves | Sept. 15, 1953 |
| 2,663,793 | Novak | Dec. 22, 1953 |